July 26, 1949.　　　　B. J. WOLFE　　　　2,477,107
SLIDE PROJECTOR
Filed Aug. 31, 1946
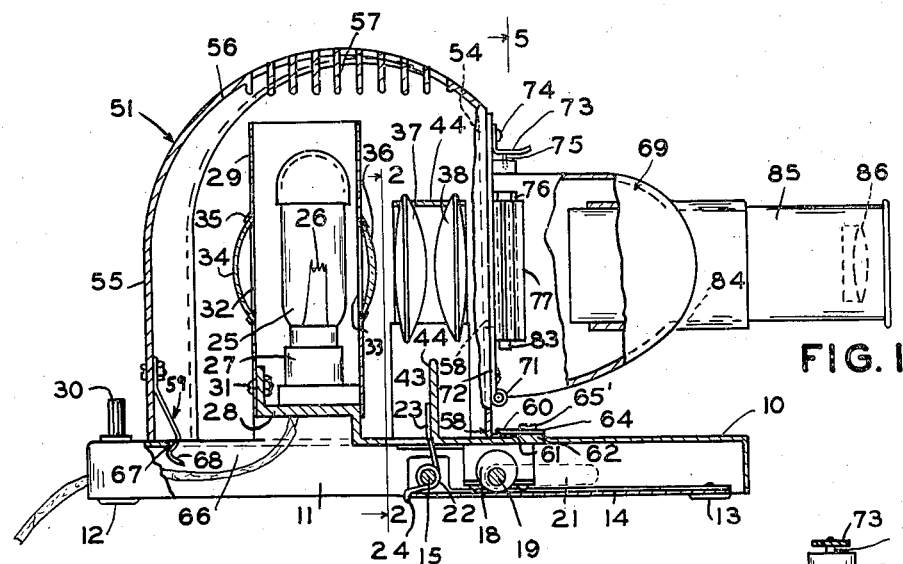
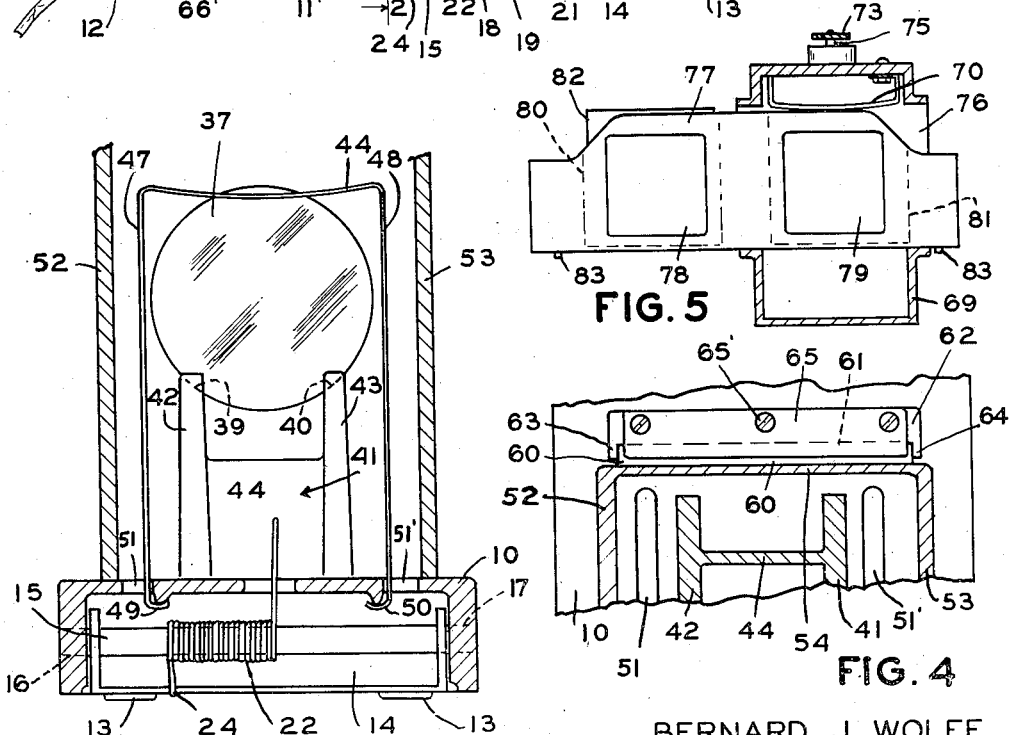
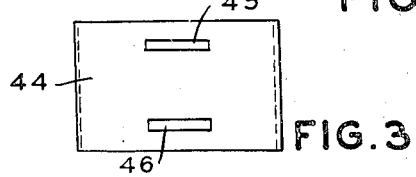
BERNARD J. WOLFE
Inventor Patented July 26, 1949

2,477,107

UNITED STATES PATENT OFFICE 2,477,107

SLIDE PROJECTOR

Bernard J. Wolfe, Irondequoit, N. Y., assignor to Bausch & Lomb Optical Company, Rochester, N. Y., a corporation of New York Application August 31, 1946, Serial No. 694,198

3 Claims. (Cl. 88—26)

The present invention relates to optical apparatus and more particularly to a device for projecting images of transparencies such as slides or mounted films.

It is an object of the present invention to provide a novel device of the above type which is sturdy, easy and convenient to use, and economical to manufacture.

It is a further object to provide such a device comprising a readily-demountable housing which upon removal exposes the inner parts of the projector for servicing.

It is another object to provide such a device in which the reliability of alignment of the lenses thereof is unimpaired by the demountability of certain lens-holding parts in the apparatus.

It is a further object to provide such a device wherein the means for holding the demountable parts in assembled relation are simple, reliable, and do not require the use of tools to disassemble.

Further objects and advantages will be apparent to those skilled in this art by reference to the following specification and accompanying drawing in which:

Fig. 1 is a vertical sectional view, with parts in elevation, showing a preferred form of the present invention, Fig. 2 is an enlarged sectional view taken on the line 2—2 of Fig. 1, Fig. 3 is a top view of the retainer member for the condensing lenses thereof, Fig. 4 is a fragmentary top view in section of the separable connection between the housing and base members of the projection device, and Fig. 5 is a cross-sectional view of the slide carrier mechanism taken on the line 5—5 of Fig. 1.

In the projection device here disclosed, a base 10 is formed, by any advantageous manufacturing process such as die casting, with a recess 11 on its under side and is provided with the pads 12 and 13 attached at front and rear thereto on which the base rests. Means for elevating the front end of the projection device are provided in the form of a base plate 14 pivoted within the recess 11 to the base 10 by the shaft 15 which is journaled at 16 and 17 in said base. An elevating member for the base plate, such as a cam 18, is fixed on the rotatable shaft 19 within the recess 11 in a position to contact the upper side of the base plate 14. A lever 21 is fixed to the shaft 19 outside of the base 10 for actuating the cam. A torsion spring 22, carried by shaft 15, has its ends 23 and 24 bearing, respectively, against the bracket 41 carried by base 10 and the base plate 14.

Above the base 10, a lamp 25 having a suitable filament 26 is supported with the filament thereof substantially symmetrically disposed normal to the optical axis of the projection device. Means for mounting the lamp 25 are provided in the form of a lamp socket 27 attached to the lamp bracket 28 by any suitable means, not shown. The lamp 25 may be energized from any suitable source of power through the switch 30. The bracket 28 is formed integral with the base 10 and serves also to support a light shield 29. Light shield 29 may be formed like a chimney to surround the lamp 25 and is suitably attached to the bracket 28 by any desired means such as bolts 31. Apertures 32 and 33 are provided on opposite sides of the light shield 29 in substantial alignment with the filament 26. Over the aperture 32, a reflector 34 is symmetrically fixed by any suitable means such as the metal clips 35 and a collective lens 36 preferably of heat-resistant or heat-absorbing glass is held symmetrically over the forward aperture 33 in a manner similar to the reflector 34.

Means for condensing the light rays projected by the lens 36 are provided in the form of a pair of suitable condensing lenses 37 and 38 located in alignment with the lens 36. The lower edges of lenses 37 and 38 are held in notches 39 and 40 formed in the spaced elements 42 and 43 integral with bracket 41. Bracket 41 is made integral with the base 10 and its independent rigidity is assured by the provision of an erect integral rib 44 connecting the upstanding elements 42 and 43 so that the bracket 41 is H-shaped in horizontal section, as shown in Fig. 4.

As best shown in Figs. 2 and 3 of the drawing, the condensing lenses 37 and 38 are held in the notches 39 and 40 by a resilient lens retainer 44 made of flat spring material. The retainer 44 is shaped somewhat like an arch, the upper portion being perforated to provide parallel slots 45 and 46 in which the upper portions of the lenses 37 and 38 are positioned. Straight side portions 47 and 48 on the retainer terminate at the bottoms in inwardly-directed hooks 49 and 50 which anchor under the base 10 through the slots 51 and 51'. The breadth of the lens retainer spring 44 and the stiffness of the spring material are so chosen that the upward thrust of the hooks 49 and 50 against the base 10 presses the lenses 37 and 38 into the notches 39 and 40 and securely holds the lenses in erect position.

A unitary enclosure or housing member 51 formed by any suitable manufacturing process such as die casting covers the lamp assembly and condensing lens assembly while being independent thereof. The housing 51 comprises the side walls 52 and 53 joined by the front wall 54 and rear wall 55 to form a continuous bottom edge in contact with the base 10. A curved roof 56 having ventilating louvers 57 in the area above the lamp 25 completes the enclosure 51. An aperture 58 in the front wall 54 in substantial alignment with the condensing lenses 37 and 38 permits the passage of light rays to the transparency.

According to the present invention, means for releasably holding and aligning the housing 51 in proper location on the base 10 are provided in the form of a separable joint 58 and a releasable catch 59. The separable joint 58 comprises an outwardly extending horizontal lip 60 of suitable shape and size which may, as shown in Fig. 1, extend integrally from the bottom of the front wall 54. Lip 60 is arranged to engage, for purposes of alignment of the housing 51 on the base 10 along its forward edge, against a crosswise shoulder 61 formed on the boss 62 which may, if desired, be integral with the base 10. By referring to Fig. 4, it is seen that the shoulder 61 has extensions 63 and 64 disposed longitudinally of the base 10 to form side shoulders for the purpose of transversely locating the housing 51 on the base 10. A horizontal ledge is provided to extend over and confine the lip 60 against the base 10 by fixing an overhanging plate or clip 65 of any desired form, by suitable means such as screws 65', to the top surface of the boss 62. Plate 65 may, if found desirable, be made of spring steel thus providing resilient means for holding the lip 60 against the base 10.

The releasable catch 59 which together with the lip 60 constitutes the releasable holding means for the housing 51 is fixed to the rear wall 55 thereof. An opening 66 in the base 10 has a shoulder 67 over which the catch 59 engages. The form of the catch 59 may be varied to suit circumstances but as here shown is made of flat spring material bent into the form of a hook 68 at its lower end. The angular shape of the hook 68 is such that when the catch 59 is in operative position it will effectively urge the bottom edge of housing 51 against the base 10 while simultaneously urging the lip 60 in a forward direction against the shoulder 61 to maintain proper alignment of the housing 51 with reference to the base 10.

On the outer face of the front wall 54, a lens supporting member 69 is pivotally mounted so as to swing downwardly about a hinge 71. The rear face 72 of the member 69 is held in contact with the wall 54 by releasable means of any suitable form such as the spring locking member 73 fixed to the wall 54 at 74 and having a hole therein engaged by a pin 75 which is fixed to the supporting member 69. Transversely across the face 72, a horizontal open slot 76 is formed for accommodating a slide carrier 77 therein. The usual dual apertures, 78, 79 are provided in the slide carrier 77 for the passage of light therethrough when the slide carrier 77 is in either of its two operative positions in alignment with the condensing lenses 37 and 38. Dual vertical cavities 80, 81 in which transparencies 82 such as slides or mounted films are held substantially symmetrically over said dual apertures 78, 79 are also provided in the usual way. The slide carrier 77 is freely slidable back and forth in slot 76 and suitable resistance to such movement is provided by tension spring 70 which bears against the upper edge of slide carrier 77. Downwardly projecting stops 83 are secured to the respective ends of the carrier for limiting its lateral movement.

The lens-supporting member 69 is hollow and is provided with a cylindrical passage 84 in the nose portion thereof wherein a focusing tube 85 is slidably and adjustably held. An objective lens 86 is mounted in the focusing tube 85 for forming an image of the transparency 82 by the light rays which are projected from the lamp 25 through the transparency.

When it is desired to remove the slide carrier 77, the locking member 73 is flexed upwardly until the pin 75 is released therefrom thus allowing the lens mounting member 69 to swing downwardly so that the slide carrier 77 can be removed from the open slot 76. If it is necessary to remove the housing 51 for servicing of the optical elements or otherwise, the catch 59 is flexed forwardly by reaching underneath the base 10 and the rear of the housing is thereupon lifted off the base 10, meanwhile pivoting the housing 51 about its lip 60. As soon as the catch 59 is free of the base 10, the housing 51 is drawn backwardly to free the lip 60 from the overhanging plate 64 and thereafter the entire housing with the lens-mounting member 69 attached may be lifted off the base 10.

Although but one embodiment of the invention has been shown and described in detail, it will be understood that other forms are possible and that changes may be made in the proportion of the parts and the arrangement thereof without departing from the spirit of the invention as defined in the appended claims.

I claim:

1. In a projector having a housing enclosing a light source and condensing lens means and having an aperture in the front wall of the housing in alignment with the lens means, the combination of a hinge mounted on the front wall beneath the aperture, a tubular lens supporting member secured to the hinge whereby the member may be selectively moved into engagement with the front wall, the face of the member which contacts the front wall having an open slot formed therein whereby the front wall coacts with the open slot to form a passageway, a slide carrier movably mounted in the passageway, and latch means for holding the member against the front wall for retaining the slide carrier in the passageway whereby the slide carrier is removably held within the passageway.

2. A projection device comprising a base, a light source supported by the base, light condensing means mounted on the base in operative alignment with the light source, a unitary housing for said source and condensing means, said housing having front, rear, top and side walls, a lip projecting from the bottom of the front wall, an integral boss on said base, a plate secured to and projecting over the boss, said lip cooperating with the plate on the boss for detachably holding the front end of the housing to the base, latch means for releasably holding the rear end of the housing to the base and a slide carrier and objective lens supported by the front wall of the housing in operative alignment with the condensing means.

3. In a projection device the combination of a base, a bracket integrally formed with the base, a light source mounted on the bracket, a second bracket integrally formed with the base, said second bracket being H-shaped in horizontal section and comprising two spaced upright elements connected by an integral rib, said elements having spaced pairs of notches, spaced condensing lenses having their lower edges positioned in the respective pairs of notches, a housing carried by the base for enclosing said light source and lenses, and means on the housing for supporting a transparency opposite an aperture in the housing which is aligned with the source and lenses.

BERNARD J. WOLFE.

REFERENCES CITED

The following references are of record in the file of this patent:

UNITED STATES PATENTS

| Number | Name | Date |
| --- | --- | --- |
| 439,420 | McIntosh | Oct. 28, 1890 |
| 1,579,880 | Meissner et al. | Apr. 6, 1926 |
| 2,221,920 | Kurtz et al. | Nov. 19, 1940 |
| 2,275,863 | Rauch | Mar. 10, 1942 |
| 2,276,735 | Miller | Mar. 17, 1942 |
| 2,285,915 | Dutton | June 9, 1942 |